(12) United States Patent
Hansen et al.

(10) Patent No.: US 9,457,634 B2
(45) Date of Patent: Oct. 4, 2016

(54) PROGRESSIVE RATE SUSPENSION FOR AGRICULTURAL VEHICLE

(71) Applicant: AGCO Corporation, Hesston, KS (US)

(72) Inventors: Donald Scott Hansen, Fairmont, MN (US); Tony Becker, Ramsey, MN (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 14/854,244

(22) Filed: Sep. 15, 2015

(65) Prior Publication Data

US 2016/0075200 A1 Mar. 17, 2016

Related U.S. Application Data

(60) Provisional application No. 62/050,998, filed on Sep. 16, 2014.

(51) Int. Cl.
*B60G 3/20* (2006.01)
*B60G 7/00* (2006.01)
*B60K 7/00* (2006.01)

(52) U.S. Cl.
CPC ............... *B60G 3/207* (2013.01); *B60G 7/001* (2013.01); *B60K 7/00* (2013.01); *B60G 2204/12* (2013.01); *B60G 2204/126* (2013.01); *B60G 2204/128* (2013.01); *B60G 2204/129* (2013.01); *B60G 2204/421* (2013.01); *B60G 2300/08* (2013.01); *B60G 2800/014* (2013.01); *B60K 2007/0038* (2013.01)

(58) Field of Classification Search
CPC ........ B60G 3/20; B60G 3/26; B60G 17/005; B60G 9/02; B60G 3/145; B60G 3/14; B60G 3/2057

See application file for complete search history.

(56) References Cited

U.S. PATENT DOCUMENTS

| | | | | |
|---|---|---|---|---|
| 4,657,271 A | * | 4/1987 | Salmon | B62D 9/02 280/124.139 |
| 4,863,188 A | * | 9/1989 | Killian | B60G 3/26 280/124.138 |
| 5,022,673 A | * | 6/1991 | Sekino | B60G 3/20 280/124.138 |
| 5,286,052 A | * | 2/1994 | Lukianov | B60G 3/26 280/124.134 |
| 5,513,874 A | * | 5/1996 | Mori | B60G 3/20 280/124.108 |
| 5,540,297 A | * | 7/1996 | Meier | B60G 7/001 180/6.5 |
| 5,597,171 A | * | 1/1997 | Lee | B60G 3/20 280/124.138 |
| 6,036,201 A | * | 3/2000 | Pond | B60G 3/20 280/5.514 |

(Continued)

*Primary Examiner* — Hau Phan (57) ABSTRACT

A suspension apparatus connected to a wheel of a vehicle and includes a first linkage, a second linkage, a third linkage, a bell crank, and a shock absorber. The first linkage connects to the wheel. The second linkage includes a first portion that is pivotally connected to a second portion of the first linkage. The third linkage includes a first portion that is pivotally connected to a second portion of the second linkage. The bell crank includes opposed first and second arms and a central pivot connection to the third linkage, wherein the first arm is pivotally connected to a first portion of the first linkage. The shock absorber has a variable length and includes a first portion that is pivotally connected to the first portion of the third linkage and wherein a second portion of the shock absorber is pivotally connected to the second arm of the bell crank.

20 Claims, 9 Drawing Sheets

(56) References Cited

U.S. PATENT DOCUMENTS

| | | | | |
|---|---|---|---|---|
| 6,182,979 B1* | 2/2001 | Lee | ............ | B60G 3/20 |
| | | | | 280/5.506 |
| 8,376,078 B2* | 2/2013 | Hiddema | ............ | A01C 23/008 |
| | | | | 180/209 |
| 8,534,686 B1 | 9/2013 | Slawson | | |
| 9,290,074 B2* | 3/2016 | Slawson | ............ | B60G 17/005 |
| 2006/0184037 A1* | 8/2006 | Ince | ............ | A61B 1/042 |
| | | | | 600/476 |
| 2006/0283653 A1* | 12/2006 | Buschena | ............ | B60G 3/145 |
| | | | | 180/340 |
| 2009/0224501 A1* | 9/2009 | Carlson | ............ | B60G 9/02 |
| | | | | 280/124.1 |
| 2012/0318588 A1* | 12/2012 | Kroese | ............ | B60G 3/08 |
| | | | | 180/41 |

* cited by examiner

| β Bellcrank Position (degrees) | Length (mm) | Shock/Spring Movement (mm) |
|---|---|---|
| 60 | 664.589 | |
| 70 | 647.785 | 16.804 |
| 80 | 628.262 | 21.891 |
| 90 | 606.371 | 25.229 |
| 100 | 582.549 | 26.072 |
| 110 | 557.32 | 23.527 |
| 120 | 531.305 | |
| 130 | 505.233 | |
| 140 | 479.953 | |
| 150 | 456.426 | |

FIG. 9

PROGRESSIVE RATE SUSPENSION FOR AGRICULTURAL VEHICLE

CROSS REFERENCE TO RELATED APPLICATION

This application claims the benefit of U.S. Provisional Application No. 62/050,998, filed Sep. 16, 2014, which is hereby incorporated by reference in its entirety.

BACKGROUND OF THE INVENTION

1. Field of Invention

This invention relates generally to suspension systems work machines and more particularly to a progressive, independent suspension system for work machines.

2. Description of Related Art

The term "tractor" commonly refers to a vehicle designed to deliver a high torque at slow speeds, such as for hauling a trailer or machinery used in agriculture or construction. Agricultural implements such as sprayers, seeders, and harvesters, for example, may be towed behind or mounted on a tractor, and the tractor may also provide a source of power if the implement is mechanized.

Conventionally, agricultural implements and vehicles, including tractors, have either a live axle, which is not an independent suspension, or a non-progressive independent suspension system. Such conventional suspension systems typically give a rough ride quality, especially when bumps in the terrain result in suspension bottoming.

SUMMARY OF THE INVENTION

In one aspect, a suspension apparatus is configured for connection to a ground-engaging wheel of a device. The apparatus comprises a first linkage, a second linkage, a third linkage, a bell crank, and a shock absorber. The first linkage comprises opposed first and second portions, the first linkage configured for connection to the ground-engaging wheel. The second linkage comprises opposed first and second portions, wherein the first portion of the second linkage is pivotally connected to the second portion of the first linkage. The third linkage comprises opposed first and second portions, wherein the first portion of the third linkage is pivotally connected to the second portion of the second linkage. The bell crank comprises opposed first and second arms and a central pivot connection to the third linkage, wherein the first arm is pivotally connected to the first portion of the first linkage at a first pivot connection. The shock absorber has a variable length and comprises opposed first and second portions, wherein the first portion of the shock absorber is pivotally connected to the first portion of the third linkage and wherein the second portion of the shock absorber is pivotally connected to the second arm of the bell crank at a second pivot connection.

In another aspect, a progressive, independent suspension system is configured for use on a device comprising at least four ground-engaging wheels. The system comprises a suspension apparatus connected to each of the at least four ground-engaging wheels. Each suspension apparatus comprises a first linkage, a second linkage, a third linkage, a bell crank, and a shock absorber. The first linkage comprises opposed first and second portions, the first linkage configured for connection to the ground-engaging wheel. The second linkage comprises opposed first and second portions, wherein the first portion of the second linkage is pivotally connected to the second portion of the first linkage. The third linkage comprises opposed first and second portions, wherein the first portion of the third linkage is pivotally connected to the second portion of the second linkage. The bell crank comprises opposed first and second arms and a central pivot connection to the third linkage, wherein the first arm is pivotally connected to the first portion of the first linkage at a first pivot connection. The shock absorber has a variable length and comprises opposed first and second portions, wherein the first portion of the shock absorber is pivotally connected to the first portion of the third linkage and wherein the second portion of the shock absorber is pivotally connected to the second arm of the bell crank at a second pivot connection.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

The figures may not be drawn to scale. In particular, some features may be enlarged relative to other features for clarity. Moreover, where terms such as above, below, over, under, top, bottom, side, right, left, etc., are used, it is to be understood that they are used only for ease of understanding the description. It is contemplated that structures may be oriented otherwise.

DETAILED DESCRIPTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

A suspension system is disclosed that allows a progressive rate of suspension relative to vertical wheel travel, which improves ride quality and prevents bottoming of the system. In an exemplary embodiment, this is accomplished by using a 4-bar linkage, wherein one of the linkages is a bell crank. The disclosed configuration allows the suspension system to become progressively stiffer as the wheel travels through its vertical range of motion. The bell crank in an exemplary embodiment directs force to a spring or other shock absorber. Such a suspension may be used on tractors, agricultural sprayers, and other implements to allow a progressive, fully independent suspension system for the machine. An exemplary embodiment of the disclosed suspension system is compact, in that it fits closely next to a wheel of a vehicle. In some vehicles, a clearance space is desired between the wheels. For example, with an agricultural tractor, it is desirable to be able to drive the tractor through a crop field with the wheels traveling between planted rows and the body of the tractor raised above the crops to prevent damage thereto. Thus, even when used with vehicles having four or more wheels, because of the compact arrangement of the disclosed suspension system, the system is particularly suitable for applications wherein a clearance space is desired between the wheels.

Figure 1:
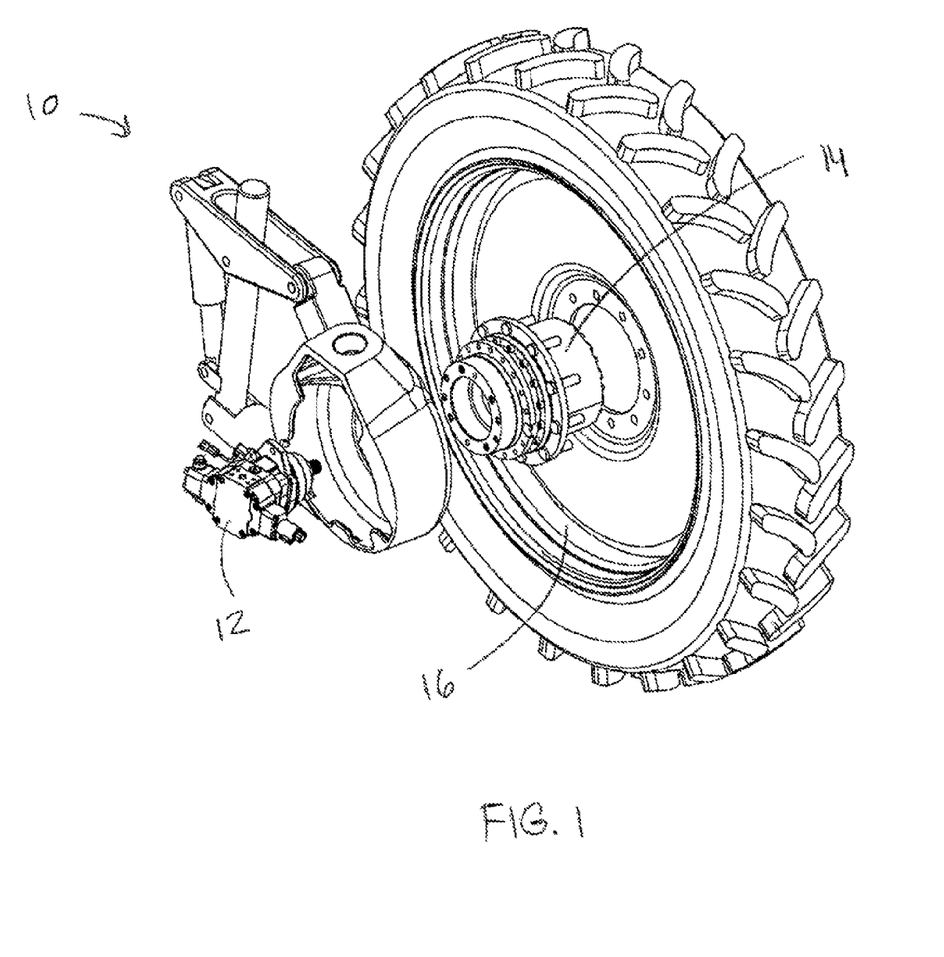
FIG. 1 is an exploded perspective view of a wheel and an exemplary suspension apparatus of the present disclosure.
Figure 2:
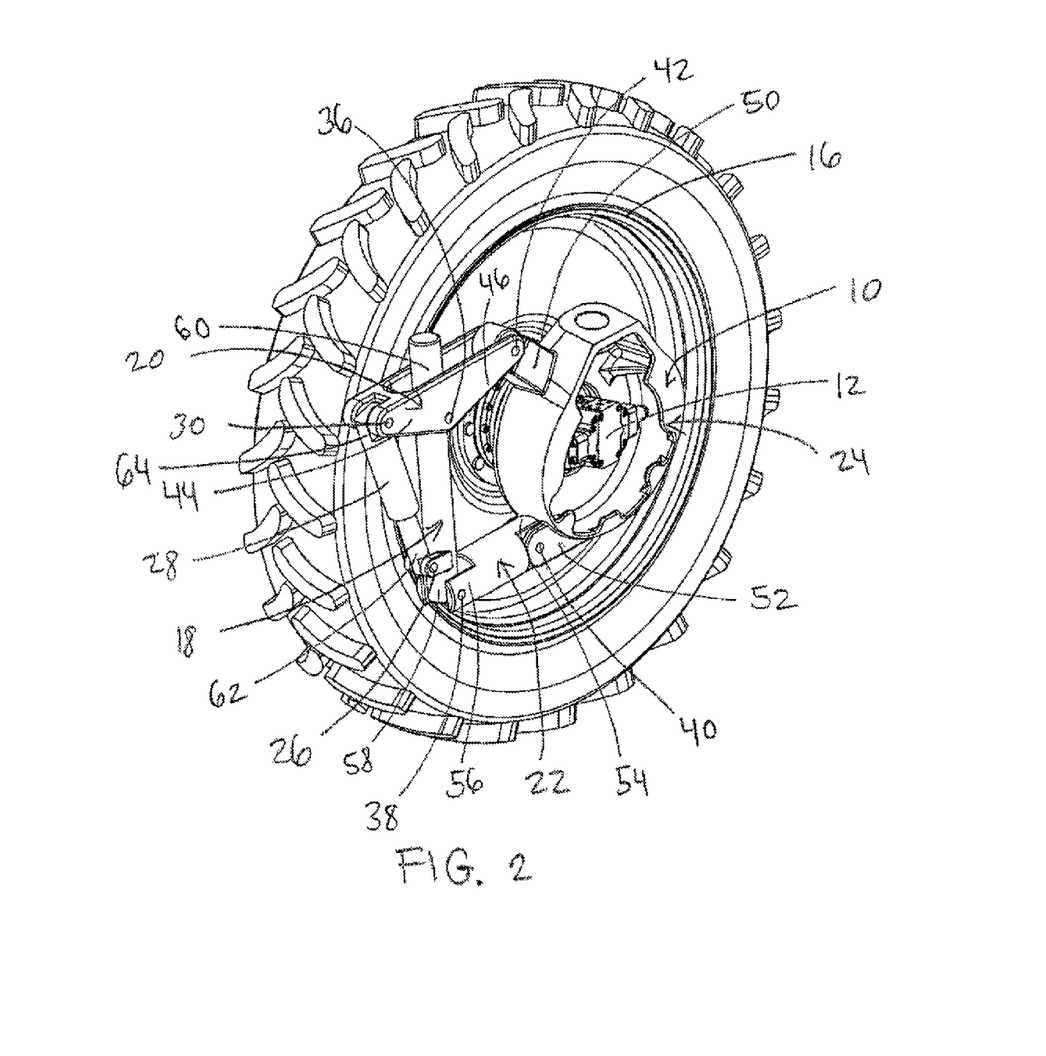
FIG. 2 is a perspective view of the wheel and suspension system of FIG. 1 assembled together on the inside of the wheel.

FIG. 1 is an exploded view of suspension apparatus 10, wheel motor 12, gear box 14 and wheel 16. Suspension apparatus 10 is configured for connection to a ground-engaging wheel 16 of a device such as a machine, vehicle or implement used in agricultural, industrial, recreational, or other applications. FIG. 2 is a front perspective view of the suspension apparatus 10 of FIG. 1, assembled onto the wheel 16 with gear box 14 and wheel motor 12. In an exemplary embodiment, suspension apparatus 10 comprises a 4-bar linkage including vertical post 18, bell crank 20, bottom link 22 and motor housing 24.

In the exemplary 4-bar linkage, one of the linkages is configured as a housing 24 of the motor 12 and/or gear box 14 of wheel 16. Housing 24 is configured for connection to wheel 16 by conventional means. Housing 24 includes opposed first portion 50 and second portion 52. In an exemplary embodiment, second portion 52 is configured for connection to a second linkage, such as bottom link 22 at pivot connection 40. Bottom link 22 includes opposed first portion 54 and second portion 56. First portion 54 of bottom link 22 is pivotally connected to second portion 52 of housing 24 at pivot connection 40. Second portion 56 of bottom link 22 is configured for connection to a third linkage, such as vertical post 18 at pivot connection 38. Vertical post 18 includes opposed first portion 58 and second portion 60. First portion 58 of vertical post 18 is pivotally connected to second portion 56 of bottom link 22 at pivot connection 38. Second portion 60 of vertical post 18 is configured for connection to bell crank 20 at central pivot connection 36. Bell crank 20 includes opposed first arm 46 and second arm 44. First arm 46 is pivotally connected to first portion 50 of housing 24 at pivot connection 42. Second arm 44 is configured for connection to shock absorber 28 at pivot connection 30. Shock absorber 28 of variable length includes opposed first portion 62 and second portion 64. First portion 62 of shock absorber 28 is pivotally connected to first portion 58 of vertical post 18 at pivot connection 26. Second portion 64 of shock absorber 28 is configured for pivotal connection to second arm 44 at pivot connection 30.

Figure 3:
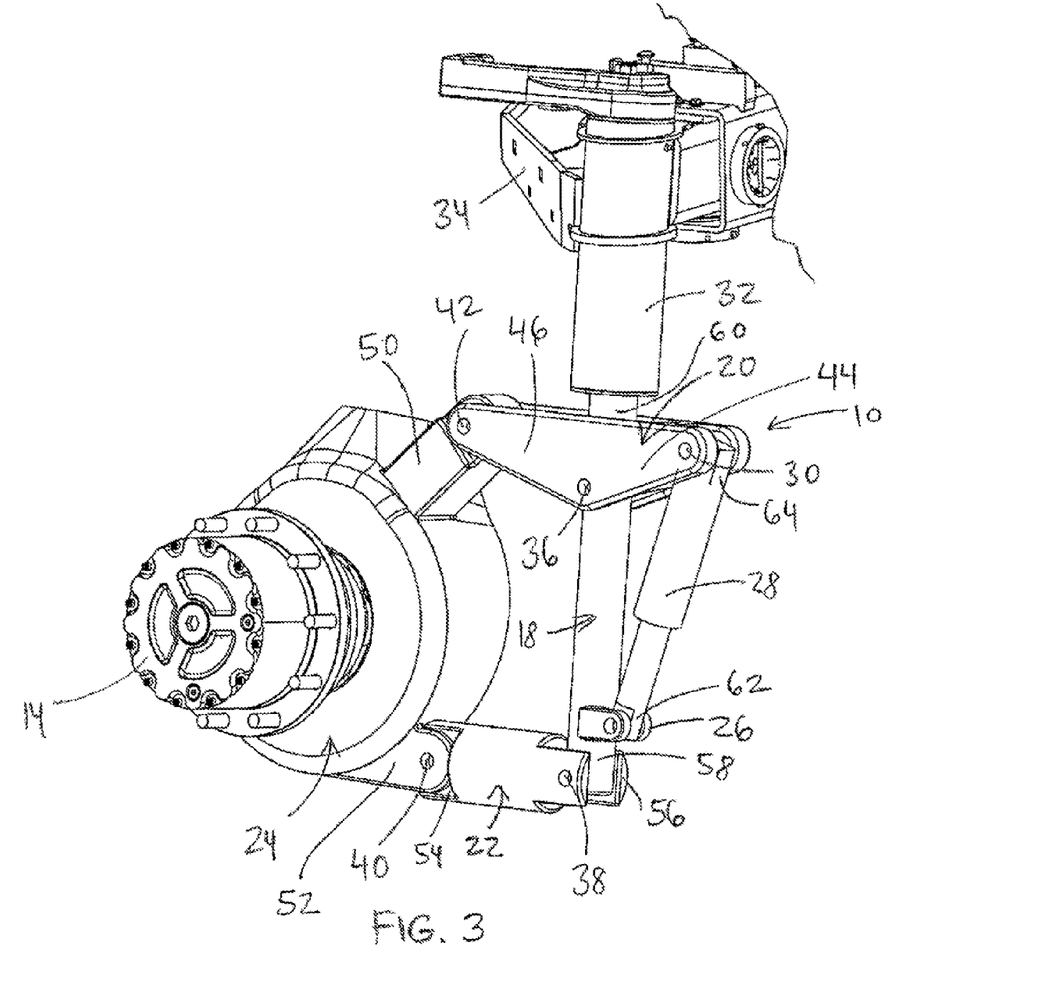
FIG. 3 is a front perspective view of an exemplary suspension system, removed from the wheel and connected to a steer arm of an agricultural implement.

FIG. 3 is an outside front perspective view of suspension apparatus 10 and gear box 14 removed from wheel 16 and connected to steer arm 34 of an agricultural implement. In an exemplary embodiment, vertical post 18 is in the form of a kingpin inserted through a kingpin housing 32, which is in turn connected to steer arm 34. An exemplary steer arm configuration is disclosed in U.S. Pat. No. 8,534,686, entitled "Independent Strut Suspension," assigned to AGCO Corporation, which is fully incorporated herein by reference. The steer arm is connected to an agricultural vehicle in a conventional manner, such as by connection to an axle of the vehicle.

Figure 4:
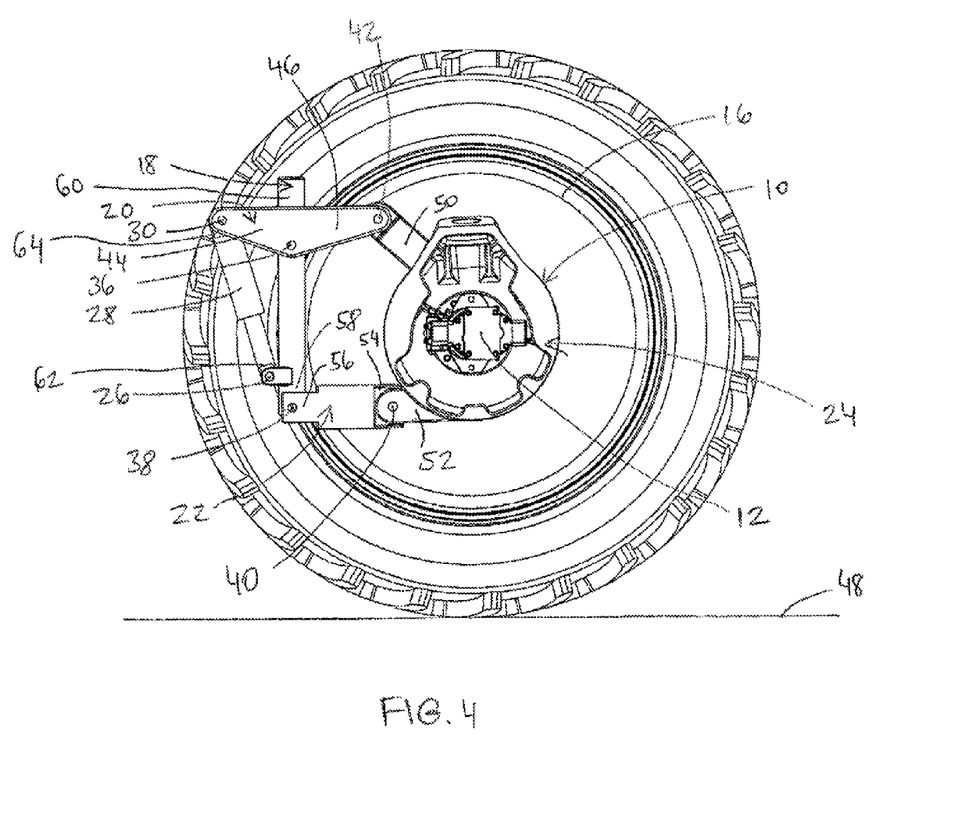
FIG. 4 is a side elevation view of the wheel and suspension system of FIGS. 1 and 2.
Figure 5:
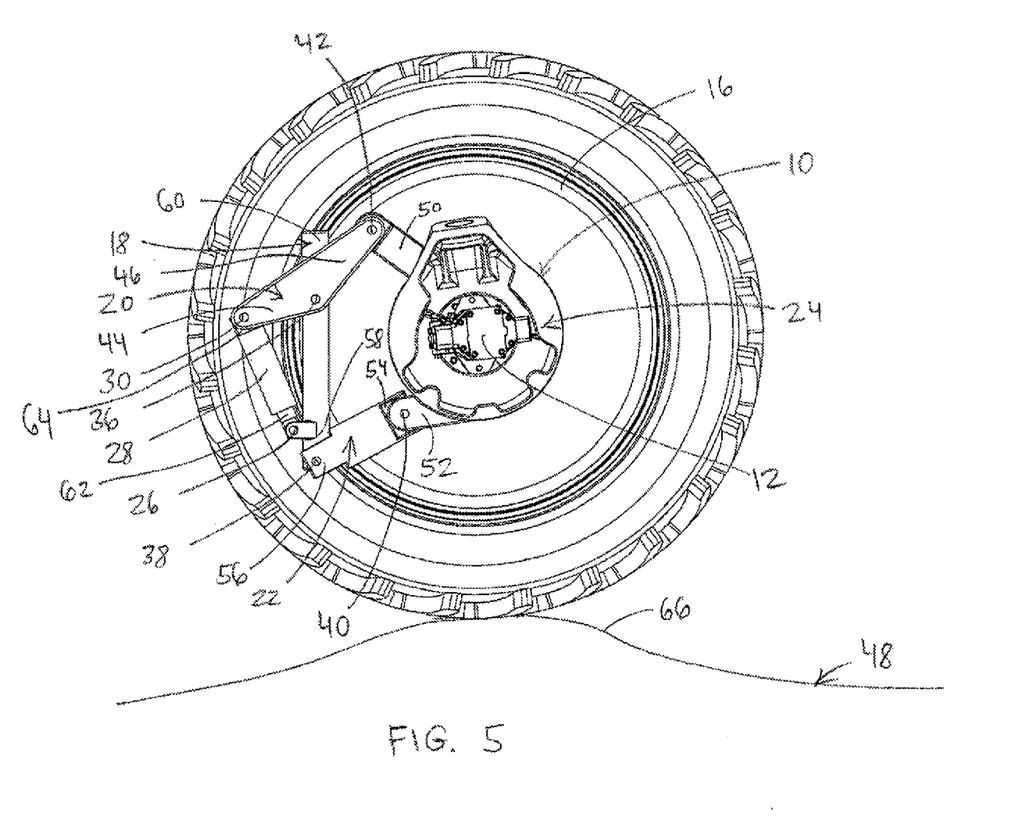
FIG. 5 is a side elevation view similar to FIG. 3, but with the suspension apparatus is a different configuration.

FIG. 4 is an inside elevation view of the suspension apparatus 10 mounted on wheel 16 with wheel motor 12, but removed from the kingpin housing 32 and the steer arm 34. FIG. 4 shows suspension apparatus 10 in a neutral position. However, when the agricultural vehicle travels over a ground surface 48, a bump 66 in the ground surface may cause wheel 16 to move upward with respect to vertical post 18, as shown in FIG. 5. In an exemplary embodiment, the position of motor housing 24 is fixed with respect to wheel 16 and wheel motor 12. Thus, relative vertical movement of vertical post 18 with respect to motor housing 24 is accommodated by the pivoting of bell crank 20 at pivot connections 36 and 42 and the pivoting of bottom link 22 at pivot connections 38 and 40. Such pivoting of bell crank 20 at pivot connection 36 also causes a shortening of a length of shock absorber 28 between pivot connections 30, 26.

Bell crank 20 is a crank that changes motion through an angle. Bell crank 20 consists of second arm 44 and first arm 46, which meet at central pivot connection 36. When one arm 44, 46 is pulled or pushed, bell crank 20 rotates about pivot connection 36 to pull or push on the other arm 46, 44. Changing the length of the arms 44, 46 and/or an angle between the arms 44, 46 changes the mechanical advantage of the system. In the illustrated embodiment, first arm 46 is longer than second arm 44, thus forming a longer lever arm between pivot connections 36 and 42 than the shorter lever arm between pivot connections 30 and 36.

Figure 6:
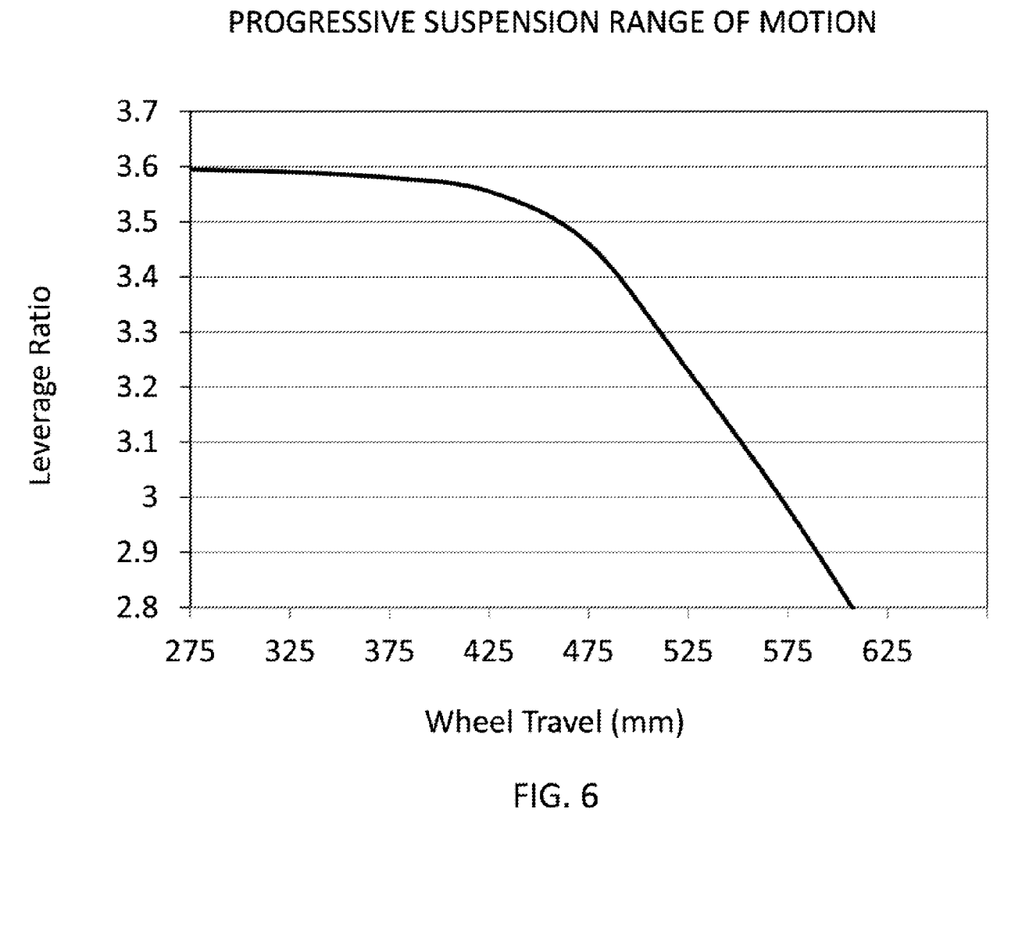
FIG. 6 is a graph showing that as vertical wheel travel increases, the leverage ratio (wheel travel/shock absorber length change) decreases.

FIG. 6 is a graph showing the motion ratio of an exemplary suspension apparatus 10. Referring to the x axis, the farther wheel 16 travels through a vertical range of motion, the more the leverage ratio (wheel travel/shock absorber length change) (on the y axis) decreases. This causes the spring or shock absorber 28 to be harder to compress because of the loss in mechanical advantage. Thus, this also gives the shock absorber 28 an anti-bottoming characteristic toward the end of the stroke.

When the bump 66 in the ground surface 48 has been traversed (see, e.g., FIG. 5), vertical post 18 returns to the upward position show in FIG. 4 by force of shock absorber 28. The disclosed suspension apparatus 10 gives an attached agricultural implement a smoother ride quality and prevents suspension bottoming. "Bottoming out" occurs when the shock absorber 28 is compressed to the point where it mechanically cannot compress any more.

Each pivot connection 26, 30, 36, 38, 40, 42 in an exemplary embodiment is a pinned connection that allows the connected links to rotate freely with respect to each other, with very little friction. Moreover, ideally, each linkage (vertical post 18, bell crank 20, bottom link 22 and motor housing 24) is a rigid member that does not deflect or wear. A bump movement is transferred through vertical post 18, which rotates bell crank 20. Bell crank 20 then transfers the load into the shock absorber 28 to absorb the kinetic energy from the bump.

Shock absorber 28 may comprise any device capable of carrying capacity (e.g. weight of an agricultural vehicle) and absorbing shock. Shock absorber 28 may comprise, but is not limited to, a hydraulic spring, an electro-magnetic spring, a mechanical spring, or an airbag, for example. One suitable shock absorber 28 is commercially available as the ShockWave air spring suspension from RideTech Air Ride Technologies of Jasper, Ind. Another suitable shock absorber is commercially available as the RS9000X Pro Series Remote Reservoir Coilover Shock Absorber from Rancho Suspension of Monroe, Mich.

Figure 7:
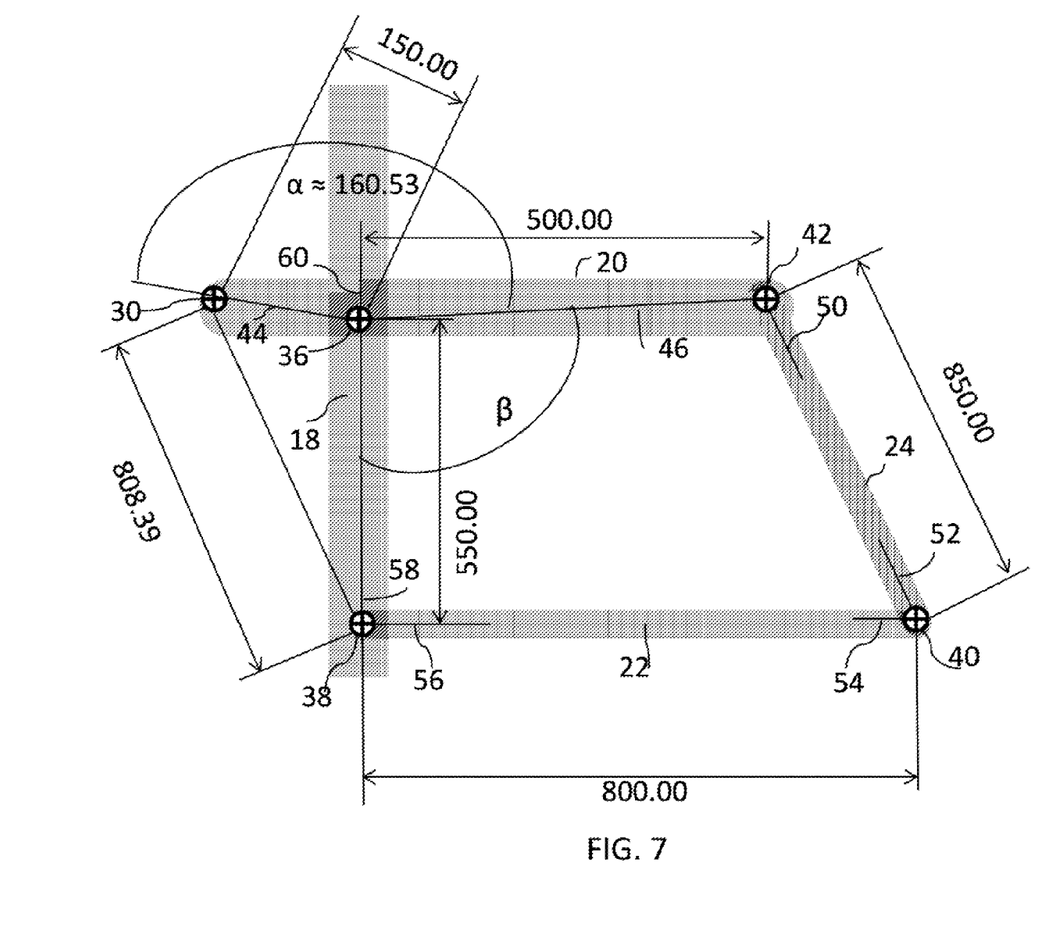
FIG. 7 is a schematic diagram of a suspension apparatus, showing exemplary dimensions of the linkages.

FIG. 7 is a schematic diagram of suspension apparatus 10, showing exemplary dimensions of the linkages. FIG. 7 is simplified for ease of illustration. For example, motor housing 24 is depicted as a straight member to show its length between pivot connections 40 and 42, although it is configured in an exemplary embodiment as a housing element that surrounds wheel motor 12, as shown in FIGS. 1-5. In the illustrated exemplary embodiment, a length of vertical post 18 between pivot connections 36, 38 is about 550 mm; a length of second arm 44 of bell crank 20 between pivot connections 30, 36 is about 150 mm; a length of first arm 46 of bell crank 20 between pivot connections 36, 42 is about 500 mm; a length of bottom link 22 between pivot connections 38, 40 is about 800 mm; and a length of motor housing 24 between pivot connections 40, 42 is about 650 mm. Angle α between second arm 44 and first arm 46 is defined between a first line intersecting pivot connection 42 and central pivot connection 36 and a second line intersecting pivot connection 30 and the central pivot connection 36. In the illustrated embodiment, angle α between second arm 44 and first arm 46 is about 160.53 degrees. However, it is contemplated that angle α can be another obtuse angle.

Figure 8:
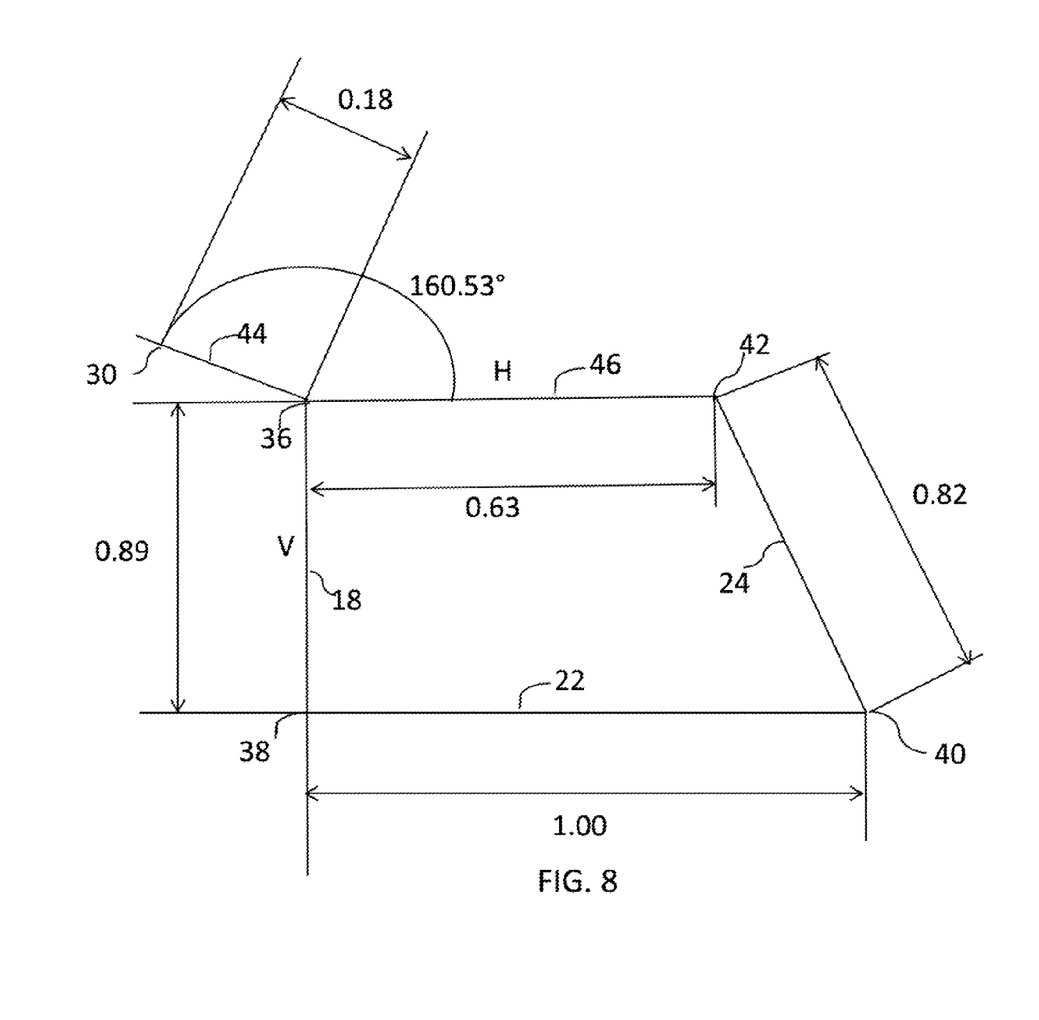
FIG. 8 is a schematic diagram showing exemplary ratios of linkage lengths compared to the bottom link.

FIG. 8 shows exemplary dimensions of each linkage as a ratio of the length of bottom link 22. Keeping the ratios close to those disclosed, suspension apparatus 10 can be scaled smaller or larger, as desired.

In the neutral position of suspension apparatus 10 shown in FIGS. 4 and 7 wherein pivot connections 30, 42 lie in a horizontal line with respect to a ground surface 48 on which wheel 16 rests, a distance between pivot connections 30, 38 is about 606.39 mm. As shown in FIGS. 4 and 5, bell crank 20 pivots about pivot connection 36 of vertical post 18. In an exemplary embodiment, an angle β (FIG. 7) between a longitudinal axis of vertical post 18 and first arm 46 can fluctuate between at least about 60 degrees and about 130 degrees. In an exemplary embodiment, suspension apparatus 10 is progressive within this range of motion.

Figure 9:
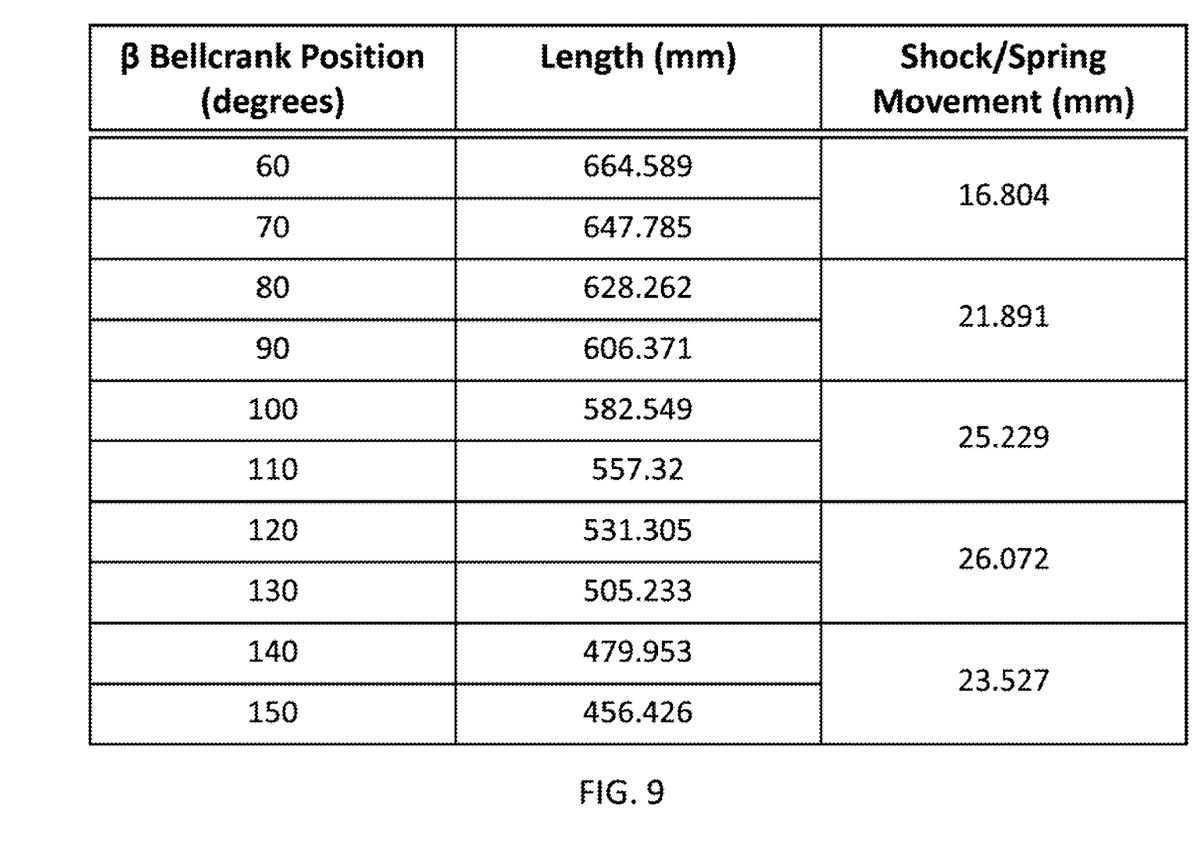
FIG. 9 is a chart showing the shock absorber length change as a function of bell crank position.

FIG. 9 is a chart showing, in the third column, the shock absorber length change between pivot connections 26, 30 as a function of the pivoting of bell crank 20 about pivot connection 36, as represented by angle β. Thus, the length change of shock absorber 28 between pivot connections 30, 26 increases for each 10 degree angular increase of angle β until angle β exceeds about 130 degrees. Thus, the variable length of shock absorber 28 is progressive over a range of pivoting motion of bell crank 20 about pivot connection 36, wherein angle β is between about 60 degrees and about 130 degrees. In this context, "progressive" means that a linear increase in angle β results in a greater than linear increase in length change of shock absorber 28. We note that the length change described is actually a decrease in the length of shock absorber 28. As shown in FIG. 9, for example, increasing angle β from 60 degrees to 70 degrees causes a length of shock absorber 28 in an exemplary embodiment to decrease by 16.804 mm. Increasing angle β from 70 degrees to 80 degrees causes a length of shock absorber 28 in an exemplary embodiment to decrease by 21.891 mm. For each 10 degree increase in angle β up to about 130 degrees, the length of shock absorber 28 shortens by increasing amounts. But beyond angle β of about 130 degrees, the length change of shock absorber 28 between pivot connections 30, 26 decreases. For example, increasing angle β from 130 degrees to 140 degrees causes a length of shock absorber 28 in an exemplary embodiment to decrease by 25.28 mm (=505.233−479.953), which is less than the 26.072 decrease in length of shock absorber 28 for increasing angle β from 120 degrees to 130 degrees. Thus, beyond angle β of about 130 degrees, suspension apparatus 10 in an exemplary embodiment is no longer progressive.

In an exemplary application, a suspension system includes a suspension apparatus 10 at each of four wheels of a device to provide the device with a progressive, independent suspension system. Such a suspension system offers a smooth ride quality and prevents bottoming of the suspension system. In addition, each wheel 16 may be independently driven, via its respective motor 24. Another advantage such a suspension system can be seen in the illustration of FIG. 2. As shown, the suspension apparatus 10 compactly fits next to the inside of wheel 16, thereby allowing clearance between the left and right wheels of a vehicle or machine. This is particularly desirable in agricultural vehicles and implements, so crops do not sustain damage from components hanging below the machine in the space between the wheels.

Although the subject of this disclosure has been described with reference to several embodiments, workers skilled in the art will recognize that changes may be made in form and detail without departing from the spirit and scope of the disclosure. In addition, any feature disclosed with respect to one embodiment may be incorporated in another embodiment, and vice-versa.

What is claimed is:

1. A suspension apparatus configured for connection to a ground-engaging wheel of a device, the apparatus comprising:
   a first linkage comprising opposed first and second portions, the first linkage configured for connection to the ground-engaging wheel, wherein the first linkage is configured as a gear box housing for a gear box of the ground-engaging wheel;
   a second linkage comprising opposed first and second portions, wherein the first portion of the second linkage is pivotally connected to the second portion of the first linkage;
   a third linkage comprising opposed first and second portions, wherein the first portion of the third linkage is pivotally connected to the second portion of the second linkage;
   a bell crank comprising opposed first and second arms and a central pivot connection to the third linkage, wherein the first arm is pivotally connected to the first portion of the first linkage at a first pivot connection; and a shock absorber of variable length comprising opposed first and second portions, wherein the first portion of the shock absorber is pivotally connected to the first portion of the third linkage and wherein the second portion of the shock absorber is pivotally connected to the second arm of the bell crank at a second pivot connection.

2. The apparatus of claim 1 wherein the first linkage is fixed to the ground engaging wheel.

3. The apparatus of claim 1 wherein each of the first linkage, second linkage, third linkage and bell crank is a rigid member.

4. The apparatus of claim 1 wherein the third linkage is configured for connection to a steer arm of the device.

5. The apparatus of claim 1 wherein the third linkage is configured for connection to an axle of the device.

6. The apparatus of claim 1 wherein an angle between a first line intersecting the first pivot connection and the central pivot connection and a second line intersecting the second pivot connection and the central pivot connection is obtuse.

7. The apparatus of claim 1 wherein the first arm is longer than the second arm.

8. The apparatus of claim 1 configured so that pivoting of the bell crank about the central pivot connection results in changing the variable length of the shock absorber, wherein such change in the variable length of the shock absorber is progressive over a range of pivoting motion of the bell crank about the central pivot connection.

9. The apparatus of claim 8 wherein the range of pivoting motion of the bell crank about the central pivot connection is described by an angle between a longitudinal axis of the third linkage and a first line intersecting the first pivot connection and the central pivot connection, and wherein the change in the variable length of the shock absorber is progressive when the angle is between about 60 degrees and about 130 degrees.

10. A suspension apparatus configured for connection to a ground-engaging wheel of a device, the apparatus comprising:

a first linkage comprising opposed first and second portions, the first linkage configured for connection to the ground-engaging wheel, wherein the first linkage is configured as a motor housing for a motor of the ground-engaging wheel;

a second linkage comprising opposed first and second portions, wherein the first portion of the second linkage is pivotally connected to the second portion of the first linkage;

a third linkage comprising opposed first and second portions, wherein the first portion of the third linkage is pivotally connected to the second portion of the second linkage;

a bell crank comprising opposed first and second arms and a central pivot connection to the third linkage, wherein the first arm is pivotally connected to the first portion of the first linkage at a first pivot connection; and a shock absorber of variable length comprising opposed first and second portions, wherein the first portion of the shock absorber is pivotally connected to the first portion of the third linkage and wherein the second portion of the shock absorber is pivotally connected to the second arm of the bell crank at a second pivot connection.

11. The apparatus of claim 10 configured so that pivoting of the bell crank about the central pivot connection results in changing the variable length of the shock absorber, wherein such change in the variable length of the shock absorber is progressive over a range of pivoting motion of the bell crank about the central pivot connection.

12. A progressive, independent suspension system configured for use on a device comprising at least four ground-engaging wheels, the system comprising a suspension apparatus connected to each of the at least four ground-engaging wheels, each suspension apparatus comprising:

a first linkage comprising opposed first and second portions, the first linkage configured for connection to the ground-engaging wheel, wherein the first linkage is configured as a motor housing for a motor of the ground-engaging wheel;

a second linkage comprising opposed first and second portions, wherein the first portion of the second linkage is pivotally connected to the second portion of the first linkage;

a third linkage comprising opposed first and second portions, wherein the first portion of the third linkage is pivotally connected to the second portion of the second linkage;

a bell crank comprising opposed first and second arms and a central pivot connection to the third linkage, wherein the first arm is pivotally connected to the first portion of the first linkage at a first pivot connection; and a shock absorber of variable length comprising opposed first and second portions, wherein the first portion of the shock absorber is pivotally connected to the first portion of the third linkage and wherein the second portion of the shock absorber is pivotally connected to the second arm of the bell crank at a second pivot connection.

13. The system of claim 12 wherein the first linkage is fixed to the ground engaging wheel.

14. The system of claim 12 wherein each of the first linkage, second linkage, third linkage and bell crank is a rigid member.

15. The system of claim 12 wherein the third linkage is configured for connection to an axle of the device.

16. The system of claim 12 wherein an angle between a first line intersecting the first pivot connection and the central pivot connection and a second line intersecting the second pivot connection and the central pivot connection is obtuse.

17. The system of claim 12 configured so that pivoting of the bell crank about the central pivot connection results in changing the variable length of the shock absorber, wherein such change in the variable length of the shock absorber is progressive over a range of pivoting motion of the bell crank about the central pivot connection.

18. The system of claim 17 wherein the range of pivoting motion of the bell crank about the central pivot connection is described by an angle between a longitudinal axis of the third linkage and a first line intersecting the first pivot connection and the central pivot connection, and wherein the change in the variable length of the shock absorber is progressive when the angle is between about 60 degrees and about 130 degrees.

19. The system of claim 12 wherein the third linkage is configured for connection to a steer arm of the device.

20. The system of claim 12 wherein the first arm is longer than the second arm.

* * * * *